(12) United States Patent  
Wagner et al.

(10) Patent No.: US 9,914,377 B2  
(45) Date of Patent: Mar. 13, 2018

(54) ACTUATION DEVICE FOR A VEHICLE SEAT, AND VEHICLE SEAT

(71) Applicant: Johnson Controls Components GmbH & Co. KG, Kaiserslautern (DE)

(72) Inventors: Marc Wagner, Kaiserslautern (DE); Heiko Pfaff, Langwieden (DE); Christian Conrad, Krickenbach (DE); Lars Crummenauer, Freisen (DE); Annerose Bergmann, Erzenhausen (DE); Andreas Kraemer, Kaiserslautern (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 15/102,657

(22) PCT Filed: Dec. 8, 2014

(86) PCT No.: PCT/EP2014/076818  
§ 371 (c)(1),  
(2) Date: Jun. 8, 2016

(87) PCT Pub. No.: WO2015/086487  
PCT Pub. Date: Jun. 18, 2015

(65) Prior Publication Data  
US 2016/0304008 A1  Oct. 20, 2016

(30) Foreign Application Priority Data

Dec. 11, 2013  (DE) .................. 10 2013 225 595  
Mar. 27, 2014  (DE) .................. 10 2014 205 725

(51) Int. Cl.  
*A47B 97/00* (2006.01)  
*B60N 2/44* (2006.01)  
(Continued)

(52) U.S. Cl.  
CPC ........... *B60N 2/44* (2013.01); *B60N 2/01516* (2013.01); *B60N 2/12* (2013.01); *B60N 2/442* (2013.01);  
(Continued)

(58) Field of Classification Search  
USPC ....................................... 248/503.1  
See application file for complete search history.

(56) References Cited

U.S. PATENT DOCUMENTS 4,997,223 A * 3/1991 Croft .................... B60N 2/2358  
297/367 R  
5,482,349 A * 1/1996 Richter ................ B60N 2/2352  
296/65.09

(Continued)

FOREIGN PATENT DOCUMENTS

DE      103 28 504 B3   12/2004  
DE  10 2008 050 468 B3    4/2010  
(Continued)

*Primary Examiner* — Monica E Millner  
(74) *Attorney, Agent, or Firm* — McGlew and Tuttle, P.C.

(57) ABSTRACT

An actuation device (100), for a vehicle seat, has at least one locking mechanism (23). The actuation device (100) has an actuation handle (152), which is mounted on a housing (110), for unlocking the at least one locking mechanism (23). A connection device (200) couples the actuation device (100) to the at least one locking mechanism (23). The actuation handle (152) can be actuated in two different directions and the at least one locking mechanism (23) can be unlocked by actuating the actuation handle (152) in one direction and by actuating the actuation handle (152) in the other direction. As a result, an operating direction of the actuation handle (152) that is oriented in the movement direction of the vehicle seat is available for each movement direction of the vehicle seat. A vehicle seat (1) is also provided having at least one locking mechanism (23) and an actuation device (100).

15 Claims, 8 Drawing Sheets

(51) Int. Cl.
*B60N 2/12* (2006.01)
*B60N 2/015* (2006.01)
*F16C 1/10* (2006.01)
*G05G 9/00* (2006.01)

(52) U.S. Cl.
CPC ............... *F16C 1/10* (2013.01); *G05G 9/00* (2013.01); *B60N 2205/40* (2013.01)

(56) References Cited

U.S. PATENT DOCUMENTS

| | | | | |
|---|---|---|---|---|
| 6,464,299 B1 * | 10/2002 | Castagna | ............... | B60N 2/206 297/378.12 |
| 6,578,919 B2 * | 6/2003 | Seibold | ................. | B60N 2/045 296/65.05 |
| 6,860,562 B2 * | 3/2005 | Bonk | ................. | B60N 2/01583 297/331 |
| 6,902,236 B2 * | 6/2005 | Tame | ..................... | B60N 2/206 297/331 |
| 7,090,277 B2 * | 8/2006 | Andrigo | ............... | B60N 2/4435 296/65.03 |
| 7,152,900 B2 * | 12/2006 | Trombley | ............ | B60N 2/0232 296/65.09 |
| 7,255,399 B2 * | 8/2007 | White | ................ | B60N 2/01583 248/421 |
| 7,575,281 B2 * | 8/2009 | Jeong | .................... | B60N 2/2354 297/341 |
| 7,578,537 B2 * | 8/2009 | Baetz | ................... | B60N 2/3013 296/65.05 |
| 7,648,202 B2 * | 1/2010 | Bokelmann | ............ | B60N 2/181 297/341 |
| 8,398,142 B2 * | 3/2013 | Stark | .................... | B60N 2/3013 296/65.05 |
| 9,333,883 B2 * | 5/2016 | Abe | ...................... | B60N 2/3013 |
| 9,499,840 B2 * | 11/2016 | Szybisty | .................. | B60N 2/64 |
| 2007/0046091 A1 | 3/2007 | Day et al. | | |
| 2010/0207421 A1 * | 8/2010 | Sayama | ................. | B60N 2/2356 296/66 |

FOREIGN PATENT DOCUMENTS

| | | |
|---|---|---|
| JP | 2008 001139 A | 1/2008 |
| WO | 02/22391 A1 | 3/2002 |

* cited by examiner

ACTUATION DEVICE FOR A VEHICLE SEAT, AND VEHICLE SEAT

CROSS REFERENCE TO RELATED APPLICATIONS

This application is a United States National Phase Application of International Application PCT/EP2014/076818 filed Dec. 8, 2014 and claims the benefit of priority under 35 U.S.C. § 119 of German Applications 10 2013 225 595.0 filed Dec. 11, 2013 and 10 2014 205 725.6 filed Mar. 27, 2014, the entire contents of which are incorporated herein by reference.

FIELD OF THE INVENTION

The invention relates to an actuation device for a vehicle seat having at least one locking mechanism, wherein the actuation device has an actuation handle, which is mounted on a housing, for unlocking the at least one locking mechanism, and wherein a connecting means couples the actuation device to the at least one locking mechanism, and to a vehicle seat.

BACKGROUND OF THE INVENTION

DE 10 2008 050 468 B3 discloses a vehicle seat which is transferrable from a use position into an entry position, and back. In the entry position, the vehicle seat is pivoted into a forward position in relation to the use position and thus permits simpler access to a rear seat row. Both the use position and the entry position are secured by means of a locking mechanism, in particular a lock. The locking mechanism has to be unlocked both before the vehicle seat is pivoted forward into the entry position and before same is pivoted back from the entry position into the use position. The movement directions of the vehicle seat during said two pivoting operations are therefore opposed.

Further vehicle seats of the type in question which, for the unlocking of a locking mechanism, have an actuation device with an actuation handle, the actuation of which leads in precisely one operating direction to opening of the locking mechanism, are known through use. In the case of opposed pivoting operations of the vehicle seat, for example from a use position into an entry position and back, the operating direction of the actuation handle lies in one of the two pivoting directions of the vehicle seat. In the other of the two pivoting directions, the operating direction of the actuation handle and the pivoting direction of the vehicle seat run in an opposed manner, and therefore the operating ergonomy is not optimum.

DE 103 28 504 B3 discloses an actuation element with only one operating direction and with an integrated indicator.

SUMMARY OF THE INVENTION

The invention is based on the problem of making available an ergonomically optimized actuation device for a vehicle seat of the type described at the beginning, and also of providing a vehicle seat equipped with such an actuation device.

The actuation device for a vehicle seat with at least one locking mechanism has an actuation handle for unlocking said at least one locking mechanism.

Owing to the fact that the actuation handle is actuable in two different directions, and the at least one locking mechanism is unlockable both by actuation of the actuation handle in the one direction and by actuation of the actuation handle in the other direction, an operating direction of the actuation handle, which operating direction is oriented in the movement direction of the vehicle seat, is provided for each movement direction of the vehicle seat. As a result, the actuation device is ergonomically optimized.

Advantageous refinements which can be used individually or in combination with one another are the subject matter of the dependent claims.

In an unactuated state, the lever can be held in a central position by an elastic means such that, from said central position and counter to a force of the stressing elastic element, the lever is selectively actuable in one of the two directions. The elastic means is preferably a spring, in particular a leg spring. The elastic means can act between the housing and the lever or between the lever and another component movable relative to the lever.

The actuation device preferably has an intersecting point, which is movable relative to the housing, for fastening the connecting means, said intersecting point being operatively connected to the actuation handle in such a manner that, when the actuation handle is actuated, the movement direction of the intersecting point is always identical and independent of the actuation direction of the actuation handle. The intersecting point permits the coupling of the actuation device to the at least one locking mechanism with connecting means which are known per se, such as cable pulls, Bowden cables or other gearing members which are known per se. The connecting means is preferably a cable pull or a Bowden cable since these are comparatively cost-effective, and a region of the intersecting point can be designed in a simple manner which is known per se for the fitting of the cable pull end or of the Bowden cable end. One or more cable pulls or Bowden cables can serve as the connecting means. The number of cable pulls or Bowden cables advantageously corresponds to the number of connecting means.

The housing of the actuation device can be a housing which is formed separately for the actuation device. As a result, the actuation device can be of modular construction. However, the housing of the actuation device may also be integrated in other components of the vehicle seat, for example a back rest structure, which reduces the number of components and the weight of the vehicle seat.

The actuation handle can drive a gearing which is operatively connected to the intersecting point. The gearing may be part of the actuation device. When the actuation handle is not actuated, individual gearing members of the gearing can be located in a dead center position, in particular by two gearing members of the gearing being in an extended position with respect to each other. The dead center position has the effect that a gearing member which is located in the dead center position can move in only one direction independently of a movement of further gearing members. Dead center positions are known, for example, from crank drives and can be produced in terms of gearing in a different manner which is known per se. For example, a piston, which is located in an upper dead center, of an internal combustion engine always moves downward independently of the direction of rotation of the crankshaft.

In a preferred actuation device, the gearing has a toothed segment connected to the actuation handle, an intermediate wheel meshing with the toothed segment, a rocker fastened to the intermediate wheel, a coupler connected to the rocker, and an eccentric connected to the coupler. The intersecting point is preferably coupled directly to the eccentric. The intermediate wheel may be a pinion. The intermediate wheel may be a spur gear.

The intersecting point can be a component which is mounted rotatably in the housing of the actuation device, wherein said component and the eccentric are rotatable about the same axis of rotation of the intersecting point. The connection of the connecting means to the intersecting point is eccentric to the axis of rotation of the intersecting point. The eccentric can be connected rigidly to the intersecting point or can be connected to the intersecting point with a small idling pass for carrying-along purposes. The intersecting point can be designed as an indicator which, by means of its angular position, indicates the locking state of the at least one locking mechanism. Such an intersecting point can therefore be a simple component with a plurality of functions. One function is the connection of the at least one connecting means and the activation of the at least one locking mechanism; a further function is the indicating of the locking state of the at least one locking mechanism.

The invention is not restricted to a specific configuration of the intersecting point. A component of any shape which is mounted on the housing so as to be rotatable about a first axis of rotation can form the intersecting point or can be connected to the intersecting point. The eccentric can also be mounted on the housing so as to be rotatable about the first axis of rotation.

The eccentric can be connected to the coupler so as to be rotatable about a second axis of rotation, the coupler can be connected to the rocker so as to be rotatable about a third axis of rotation, the intermediate wheel and the rocker can be mounted on the housing so as to be rotatable about a fourth axis of rotation, and the toothed segment and the actuation handle can be mounted on the housing so as to be rotatable about a fifth axis of rotation. Individual axes of rotation are positionally fixed with respect to the housing; other of the axes of rotation are displaceable relative to the housing.

In a preferred actuation device, when the actuation handle is not actuated, the rocker and the coupler are in an extended position with respect to each other. A suitable dead center position can thus be produced. Particularly preferably, the second axis of rotation, the third axis of rotation and the fourth axis of rotation then lie with respect to one another in such a manner that they are connectable to one another by a straight line, that is to say in a line. As a result, the movement of the actuation handle can lead without any idling travel to a movement of the intersecting point.

The component which is mounted on the housing so as to be rotatable about the first axis of rotation and which in particular can have the intersecting point or can be the intersecting point can also be an indicator which, by means of its angular position about the first axis of rotation, indicates the locking state of the at least one locking mechanism.

A vehicle seat with at least one locking mechanism and an actuating device according to the invention can be operated particularly ergonomically. In the case of a vehicle seat with two pivoting directions, the operating direction of the actuation handle and the pivoting direction of the vehicle seat always run in the same direction in the two pivoting directions. A vehicle seat with a seat longitudinal adjuster and an actuation device according to the invention can be displaced forward and rearward in an ergonomically advantageous manner by an individual standing next to the vehicle seat.

The vehicle seat can be movable, for example, between at least one use position suitable for conveying an individual and an entry position arranged further forward in the direction of travel in relation to the use position when the at least one locking mechanism is in an unlocked state. The actuation device is preferably arranged in an upper region of a backrest of the vehicle seat such that, with one operating movement, the at least one locking mechanism can be unlocked and the backrest of the vehicle seat can be moved.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
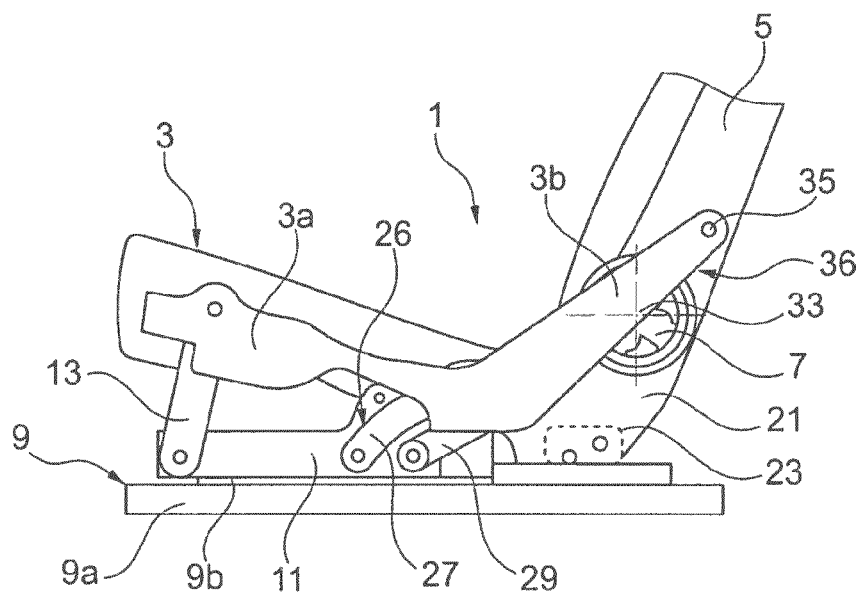
FIG. 1 is a side view, illustrated in a partially sectioned form, of a vehicle seat in a use position.
Figure 2:
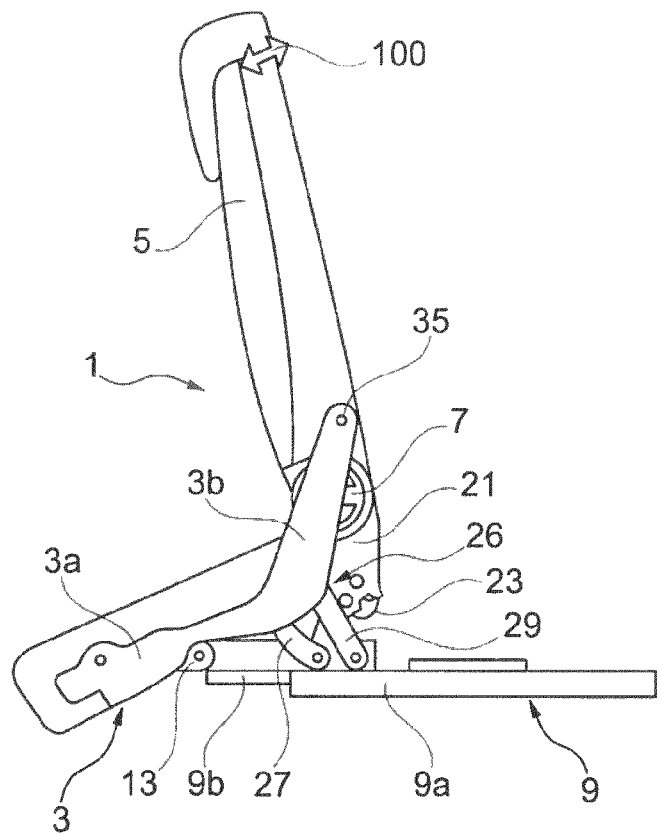
FIG. 2 is a view, corresponding to FIG. 1, of the vehicle seat in an entry position with the actuation device illustrated schematically.
Figure 3:
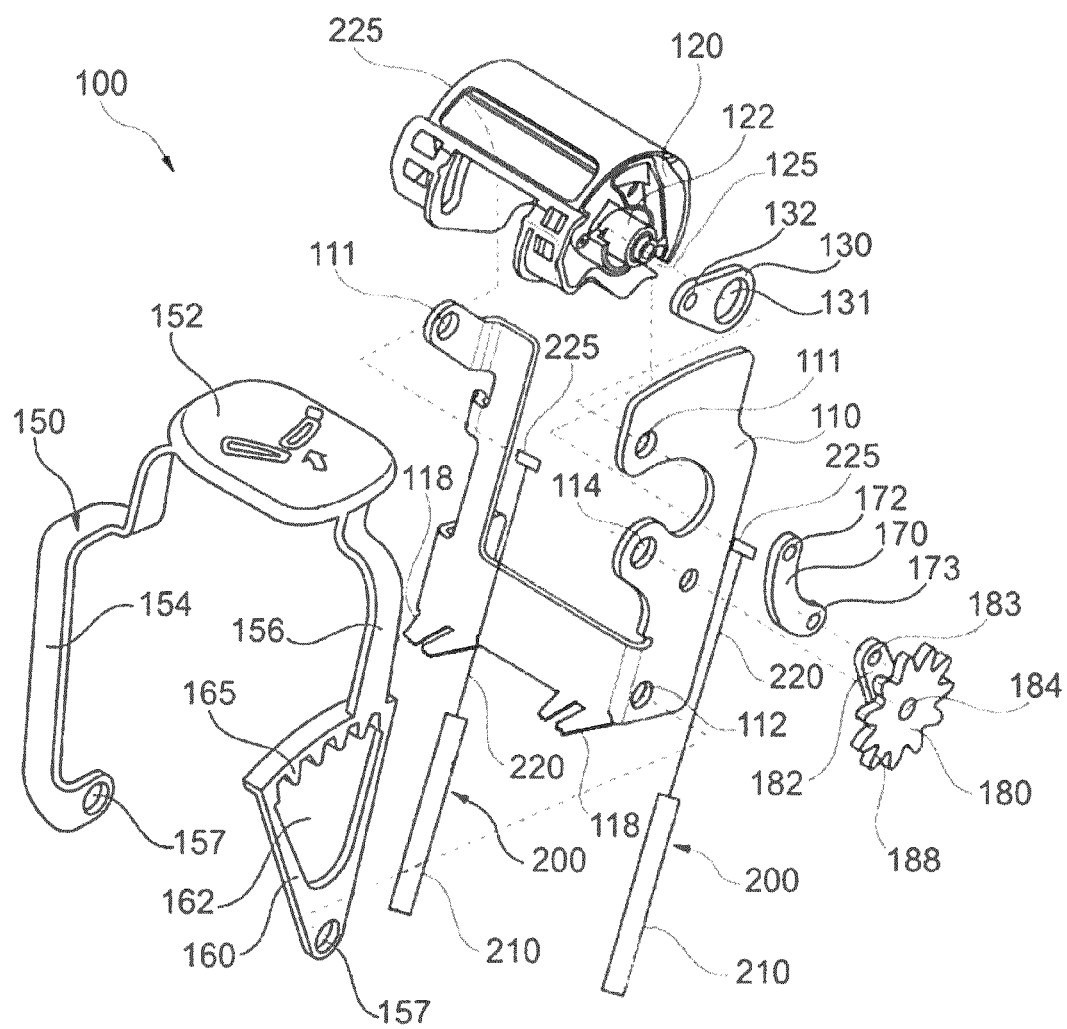
FIG. 3 is an exploded illustration of an actuation device according to the invention.

A vehicle seat 1, which is provided, for example, as the outer seat of a middle or rear seat row of a motor vehicle, for example a van, has a seat cushion 3 and a backrest 5. The starting point for the direction details below is that the vehicle seat 1 is arranged in the forward direction of travel in the motor vehicle, wherein, in a use position of the vehicle seat 1 that is suitable for conveying an individual, the backrest 5 is arranged in the region of the rear end of the seat cushion 3. In the present case, the backrest 5 is adjustable in its inclination by means of fittings 7 such that a plurality of use positions are defined. The term seat cushion 3 is intended to be understood as meaning the entire assembly, consisting of a structure, in the present case a seat cushion carrier 3a, and a covered pad. To the extent that components are coupled to the seat cushion 3, this should be understood as meaning a coupling to the structure of the seat cushion 3.

The same applies to the backrest 5. The main features of the construction of the structure of the vehicle seat 1 are already described in WO 02/22391 A1, the disclosure of which in this regard is expressly incorporated.

For the sake of simplicity below, only the left vehicle seat side of the substantially symmetrical vehicle seat 1 is described, i.e. the components mentioned below, unless described differently, are present in duplicate (optionally mirror-symmetrically). First of all, the vehicle seat 1 is described in a specific use position, namely the design position, in which the backrest 5 is inclined rearward in relation to the vertical by, for example, 23°. A base 9 of the vehicle seat 1 is connected to the structure of the motor vehicle.

In the exemplary embodiment, the base 9 is designed as a seat rail arrangement, which opens up the possibility of a longitudinal adjustment of the vehicle seat 1, but may alternatively be designed as a single component connected fixedly to the vehicle structure, or the vehicle structure itself. The various variants of the base 9 may also be combined to form a modular system. In the present case, the base 9 has a first seat rail 9a connected directly to the vehicle structure and a second seat rail 9b which is displaceable relative to the first seat rail in the longitudinal direction. The two seat rails 9a and 9b, which are of substantially U-shaped profile, engage behind each other in an alternating manner by their inwardly and outwardly curved longitudinal edges and are lockable to each other—by means of a rail lock which is known per se.

A front foot 11 is attached to the base 9, specifically is fixedly connected here to the second seat rail 9b. However, the front foot 11 could also be locked releasably to the base 9. The seat cushion 3 is coupled to the front foot 11 by means of a seat cushion rocker 13, wherein said seat cushion rocker 13 is provided at both ends with rotary joints, of which one forms the coupling to the front foot 11 and the other forms the coupling to the front end of the seat cushion 3.

Furthermore, a rear foot 21 is arranged on the base 9 behind the front foot 11 in the direction of travel, said rear foot 21 being formed separately from the front foot 11 and being releasably locked by means of a locking mechanism attached to the rear foot 21, in the present case a lock 23, to the base 9, more precisely to a base-mounted counter element, for example a bolt in the second seat rail 9b, and therefore being connected indirectly to the vehicle structure.

In addition, the rear foot 21 is coupled to the front foot 11 by means of a rear-foot four-bar linkage 26, wherein the four gearing members of the rear-foot four-bar linkage 26 comprise a first link 27 and a second link 29 which is arranged behind the first link 27 in the direction of travel, said links each having rotary joints at both ends. The rear foot 21 is therefore connected in an articulated manner to the base 9 by means of the links 27 and 29. In the use positions, the rear-foot four-bar linkage 26 is kept locked by means of the lock 23. A first fitting part of the fitting 7 is also attached to the rear foot 21, while a second fitting part of the fitting 7, which second fitting part is pivotable about a backrest pivot axis 33 relative to the first fitting part and is lockable thereto, is fastened to the backrest 5. The backrest 5 can therefore be adjusted in its inclination relative to the rear foot 21 by means of the fitting 7. The backrest pivot axis 33 runs horizontally between the two vehicle seat sides and, in a physical realization, can serve as a transmission rod between the fittings 7 present on both sides.

The seat cushion 3 is directly coupled to the backrest 5 on both sides by means of just one joint 35. For this purpose, the frame-shaped seat cushion carrier 3a, more precisely the two side parts thereof, is provided at the rear, as viewed in the direction of travel, with an arm 3b which, in the present case, is integrally formed on the seat cushion carrier 3a and protrudes obliquely upward (and rearward). The joint 35 is arranged at the end of the arm 3b. The joint 35 is arranged offset with respect to the backrest pivot axis 33 and has a pivot axis which is parallel to the backrest pivot axis 33. In the design position, the joint 35 is located above the backrest pivot axis 33 and behind same, as viewed in the driving direction. The two rotary joints of the seat cushion rocker 13, the fitting 7 having the backrest pivot axis 33, and the joint 35 form a further four-bar linkage, referred to below as the cushion four-bar linkage 36. In the use positions, said cushion four-bar linkage 36 is kept locked by means of the fitting 7.

For the adjustment of the inclination of the backrest 5, the fitting 7 on each vehicle seat side is unlocked, the backrest 5 is pivoted about the backrest pivot axis 33 into the desired position, wherein the cushion four-bar linkage 36 also moves, and subsequently each fitting 7 is locked again. The movement of the cushion four-bar linkage 36 also changes the inclination of the seat cushion 3 somewhat. The backrest 5 can also be pivoted rearward flatly such that the vehicle seat 1 takes up a lying position.

In order to transfer the vehicle seat 1 into an entry position, as an excellent not in use position, the lock 23 is unlocked by means of an actuation device 100. The rear foot 21 is now shifted forward by means of the rear-foot four-bar linkage 26, i.e. by means of the links 27 and 29, i.e., by the combination of a plurality of pivoting movements, the rear foot 21 is moved upward and forward relative to the base 9, as a result of which said rear foot moves away from the base 9. The fitting 7 remains locked in each case. As a result, the backrest 5 is in a rigid arrangement relative to the rear foot 21, but pivots forward as a whole. The forwardly pivoting seat cushion rocker 13 lowers the front end of the seat cushion 3, while the dislocation movement of the rear foot 21 raises the rear end of the seat cushion 3.

When the entry position is reached, in which access to a rear seat row is facilitated, the lock 23 locks to a bolt (not illustrated in the Figures) of the front foot 11, that is to say the rear foot 21 and the front foot 11 are locked to each other. The return into the previously adopted use position takes place by renewed actuation of the actuation device 100 and a resulting unlocking of the lock 23. After the lock 23 is unlocked, the pivoting back takes place in a reverse sequence of the steps described.

During the transition from the use position into the entry position, the locking of the seat rails 9a and 9b is optionally unlocked such that the second seat rail 9b is movable forward, which increases the space behind the vehicle seat 1, i.e. the entry size, and additionally facilitates the access. A positively controlled unlocking of the seat rails 9a and 9b, for example by one of the links 27 and 29 actuating the unlocking during the pivoting operation, is preferred. Alternatively, a different sequence is also possible.

The actuation device 100 which serves for unlocking the two locks 23 is arranged in the upper region of the backrest 5. Respective locks 23, the arrangement and function of which are substantially identical, are provided on both sides of the substantially symmetrical vehicle seat 1.

The actuation device 100 comprises a housing 110, an indicator 120, an eccentric 130, a lever 150, a coupler 170 and an intermediate wheel 180, the more detailed construction of which and the interaction of which are described below.

In the present case, the housing 110 is a substantially U-shaped metal clamp with two housing limbs and a web connecting said two housing limbs to each other. However, the housing 110 may also be formed from a different material and with a different geometry.

Two circular first housing openings 111 are provided in a region of ends of the two housing limbs, which ends each face away from the web. The center axes of the first housing openings 111 are aligned with one another and run in a transverse direction with respect to the direction of travel. The transverse direction runs horizontally and perpendicularly to the direction of travel. Two circular second housing openings 112 are provided in the region of those ends of the two housing limbs which face the web. The center axes of the second housing openings 112 are aligned with one another and likewise run in the transverse direction.

A circular third housing opening 114 is located in one of the two housing limbs of the housing 110 between one of the two first housing openings 111 and one of the two second housing openings 112. In addition, the web of the housing 110 has two supporting forks 118.

The indicator 120 has a cylindrical basic shape, the center axis of which runs in the transverse direction, and has two stepped pins 122 which lie on said center axis and engage in the first housing openings 111 in such a manner that the indicator 120 is mounted in the housing 110 so as to be rotatable about a first axis of rotation D1, which is identical to the center axis.

The indicator 120 has two intersecting points which are designed as cable pull fittings 125 and to which the ends of two cable pulls 220 of two connecting means designed as Bowden cables 200 are fastened. In the present case, a drum 225 which is integrally formed on each cable pull end is in each case fitted into a slot in the cable pull fitting 125. In addition, each Bowden cable 200 comprises a sheath 210, the one end of which is supported on one of the two supporting forks 118 and the opposite end of which is supported on the seat structure in the region of the locks 23. The two other ends of the cable pulls 210 are fastened to in each case one of the two locks 23 in such a manner that a rotation of the indicator 120 in an unlocking direction, which is oriented counterclockwise in FIGS. 4 to 15, leads to unlocking of the locks 23. The angular position of the indicator 120 also serves for indicating whether the two locks 23 are in a locked or an unlocked state. For this purpose, the indicator 120 has fields which are marked in color in a manner known per se.

The eccentric 130 has a plane, drop-shaped geometry with a first eccentric hole 131 and a second eccentric hole 132, which are in each case of circular design and are arranged offset with respect to each other. The center axis of the first eccentric hole 131 is aligned with the first axis of rotation D1, i.e. with the center axis of the indicator 120. In the region of the first eccentric hole 131, the eccentric 130 is fixedly connected to a pin 122 of the indicator 120, in particular is shrunk onto said pin or is welded thereto. This connection can alternatively also take place, for example, by means of a spline. As a result, the eccentric 130 is rotatable together with the indicator 120 about the first axis of rotation D1. The second eccentric hole 132 lies on a second axis of rotation D2 eccentrically with respect to the first axis of rotation D1.

The lever 150 is coupled to the housing 110 so as to be rotatable about a fifth axis of rotation D5 by means of two rivet bolts (not illustrated in the Figures) which each reach through one of two lever holes 157 and one of the two second housing openings 112. The lever 150 has an approximately U-shaped design with a first limb 154, a second limb 156 and an actuation handle 152 connecting the two limbs 154, 156 to each other. The fifth axis of rotation D5 is located in regions of those ends of the limbs 154, 156 which face away from the actuation handle 152.

The second limb 156 comprises a toothed segment 160 which has a triangular toothed segment opening 162 which is formed in the second limb 156. One side of the toothed segment opening 162 has a first toothing 165 which is arranged between the fifth axis of rotation D5 and the actuation handle 152 of the lever 150 and is formed in a curved manner about the fifth axis of rotation D5. Pivoting of the actuation handle 152 therefore leads to a movement of the first toothing 165 about the fifth axis of rotation D5.

The coupler 170 has a plane, kidney-shaped geometry with two ends. An, in particular circular, first coupler hole 172 is provided at one of the two ends, and an, in particular circular, second coupler hole 173 is provided at the other of the two ends. The eccentric 130 is connected to the coupler 170 so as to be rotatable about the second axis of rotation D2. For this purpose, the first coupler hole 172 is aligned with the second eccentric hole 132. A rivet bolt (not illustrated in the Figures) passes through the first coupler hole 172 and the second eccentric hole 132.

The second coupler hole 173 is aligned with a rocker opening 183 in a rocker 182 of the intermediate wheel 180. The coupler 170 is connected to the rocker 182 of the intermediate wheel 180 so as to be rotatable about a third axis of rotation D3 by a rivet bolt (not illustrated in the Figures) protruding through the second coupler hole 173 and the rocker opening 183 in the rocker 182.

The intermediate wheel 180 is a pinion with a second toothing 188. The intermediate wheel 180 is mounted in the third housing opening 114 by means of a wheel axle 184 so as to be rotatable about a fourth axis of rotation D4. The rocker 182 protrudes from the intermediate wheel 180 in the radial direction (with respect to the wheel axle 184), is offset axially with respect to the second toothing 188 and protrudes beyond the second toothing 188 in the radial direction. In the region of that end of the rocker 182 which faces away from the wheel axle 184, said rocker has the circular rocker opening 183 which likewise protrudes beyond the second toothing 188 in the radial direction.

The second toothing 188 of the intermediate wheel 180 is in engagement with the first toothing 165 of the lever 150, such that pivoting the lever 150 rotates the intermediate wheel 180.

Except for possibly tolerance-induced deviations, the axes of rotation D1, D2, D3, D4 and D5 run parallel to one another.

The housing 110, the eccentric 130, the coupler 170 and the rocker 182 of the intermediate wheel 180 are parts of a four-bar linkage chain, the hinge points of which lie on the axis of rotation D1, D2, D3 and D4 in the previously described manner. Rotation of the intermediate wheel 180 leads because of said four-bar linkage chain to rotation of the indicator 120 which is connected to the eccentric 130 and is operatively connected to the locks 23 via the Bowden cables 200.

In an unactuated state of the actuating device 100, which is also referred to below as the zero position, the lever 150 is located, because of spring prestressing, in a center position of an angular area, within which the lever 150 can pivot about the fifth axis of rotation D5. The angular area is defined via two stops (not illustrated in the Figures) which act between the lever 150 and the housing 110.

In the zero position of the actuation device 100, the vehicle seat 1 is in a locked position, that is to say the two locks 23 are locked. This locked zero position can be assigned here both to the use position and to the entry position of the vehicle seat 1.

Figure 4:
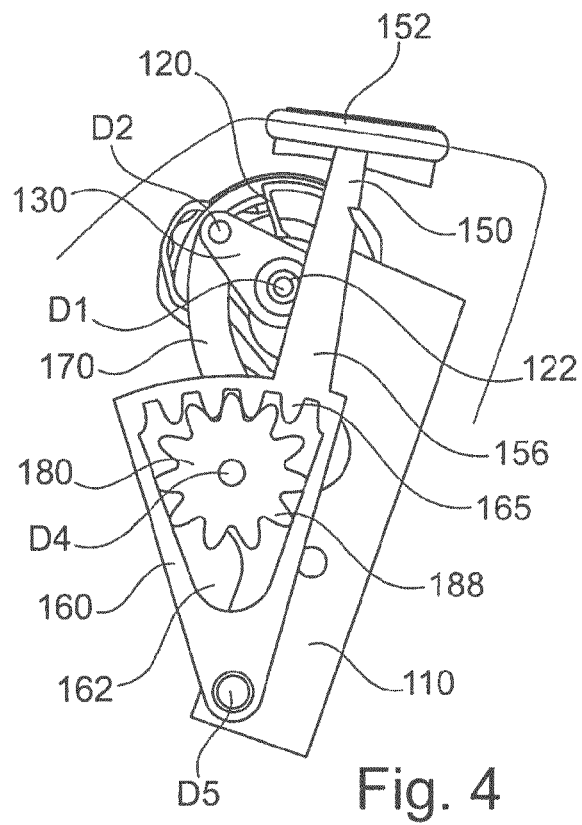
FIG. 4 is a side view of the actuation device from FIG. 3 in an unactuated state (corresponds to a zero position)
Figure 5:
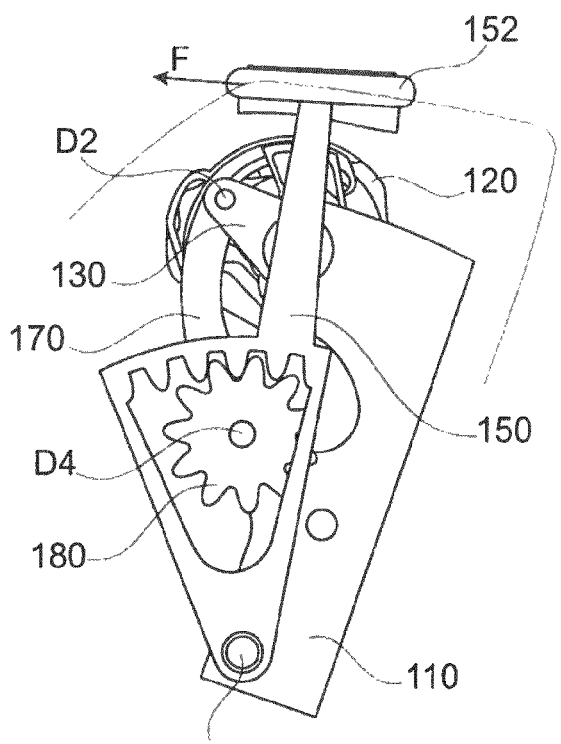
FIG. 5 is a side view, corresponding to FIG. 4, during the pivoting of the actuation handle forward (by approximately 5° in relation to the zero position)
Figure 6:
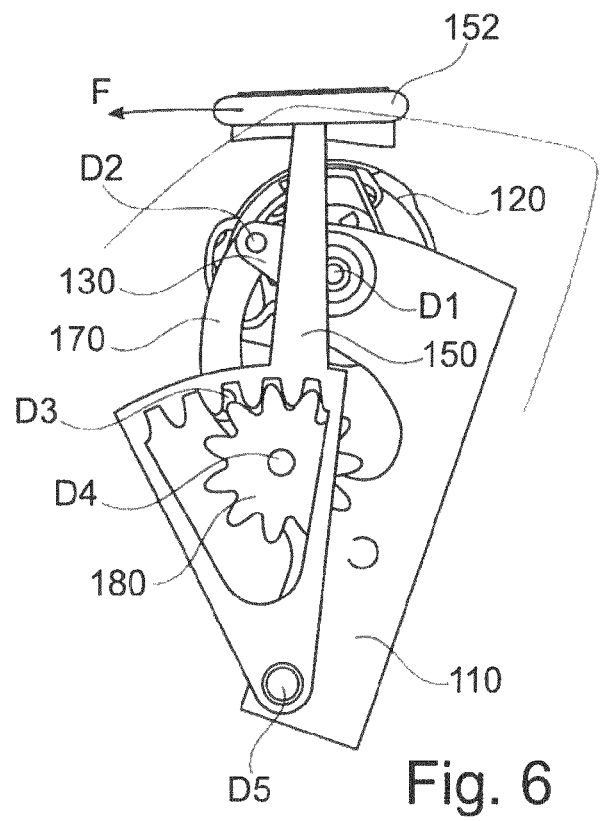
FIG. 6 is a side view, corresponding to FIG. 4, during the pivoting of the actuation handle forward (by approximately 10° in relation to the zero position)
Figure 7:
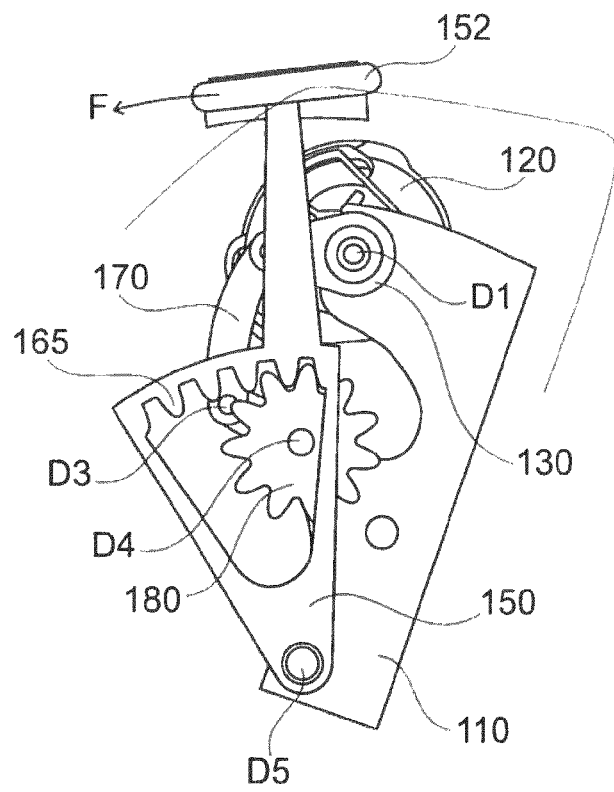
FIG. 7 is a side view, corresponding to FIG. 4, during the pivoting of the actuation handle forward (by approximately 15° in relation to the zero position)
Figure 8:
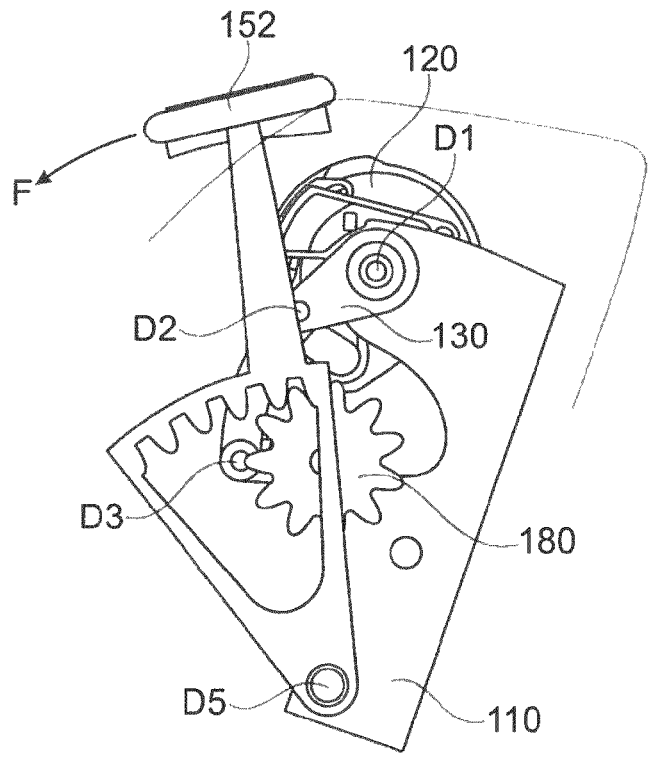
FIG. 8 is a side view, corresponding to FIG. 4, with an actuation handle pivoted completely forward (by approximately 21° in relation to the zero position)
Figure 11:
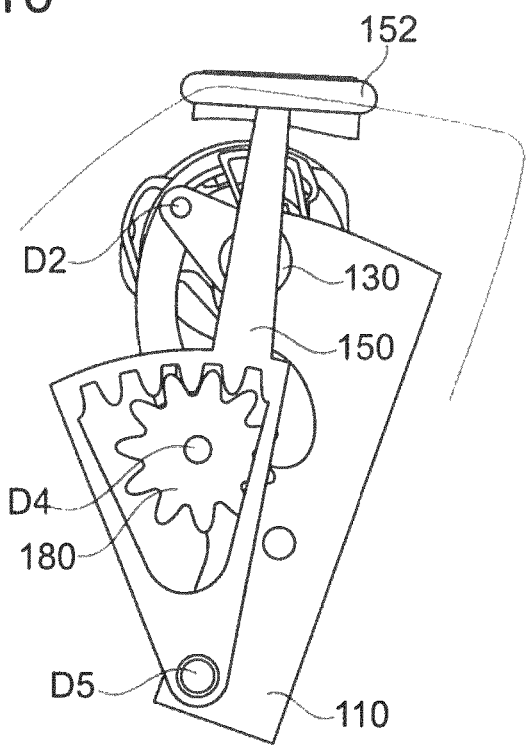
FIG. 11 is a side view, corresponding to FIG. 5, during the pivoting back of the actuation handle from the forward most position rearward in the direction of the zero position (approximately 5° forward in relation to the zero position)
Figure 12:
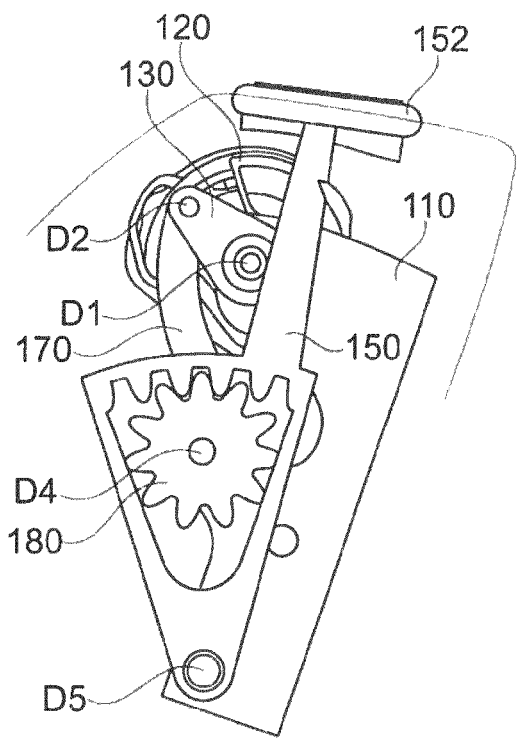
FIG. 12 is a side view, corresponding to FIG. 4, after complete pivoting back of the actuation handle into the zero position.

FIGS. 4 and 12 show the zero position of the actuation device 100, i.e. are identical. The toothed engagement between the first toothing 165 and the second toothing 188 is located approximately in the center of the first toothing 165. The rocker 182 and the coupler 170 are approximately in an extended position (upper dead center position of the rocker 182), and therefore rotation of the intermediate wheel 180 about the fourth axis of rotation D4 pulls the eccentric 130 in the direction of the fourth axis of rotation D4 irrespective of the direction of rotation of the intermediate wheel 180, and therefore rotates the indicator 120 in the same direction of rotation, counterclockwise in FIGS. 4 to 15.

Starting from the zero position, irrespective of the direction of rotation of the intermediate wheel 180, the direction of rotation of the indicator 120 is always the same. The lever 150 driving the intermediate wheel 180 can therefore be pivoted in both directions about the fifth axis of rotation D5 in order to open the locks 23.

For an ergonomic operation of the vehicle seat 1, the actuation handle 152 of the actuation device 100 is pulled forward with an actuation force F, and therefore in the movement direction of the vehicle seat 1, in order to unlock the locks 23 and subsequently pivot the vehicle seat 1 forward out of the use position into the entry position, as illustrated in FIGS. 5 to 8.

Figure 9:
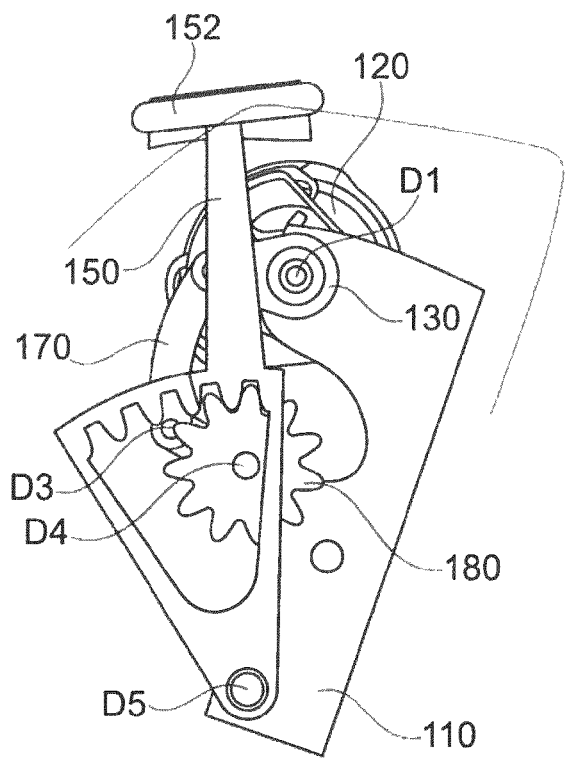
FIG. 9 is a side view, corresponding to FIG. 7, during the pivoting back of the actuation handle from the forwardmost position rearward in the direction of the zero position (approximately 15° forward in relation to the zero position)
Figure 10:
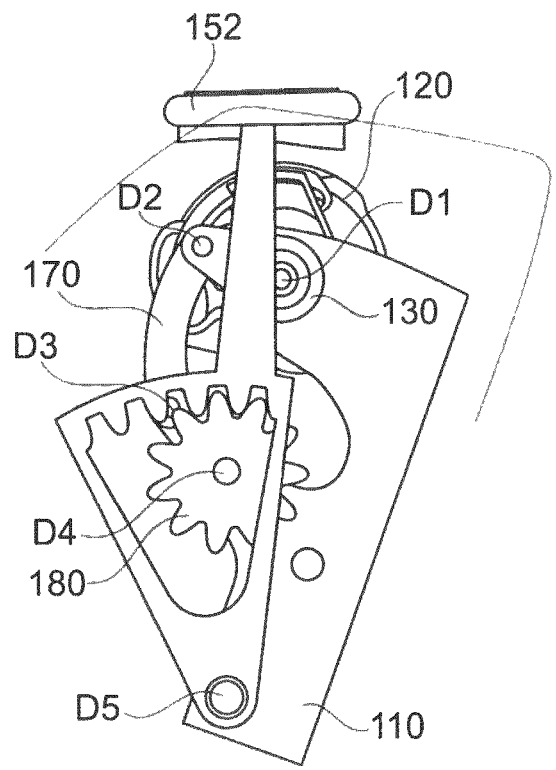
FIG. 10 is a side view, corresponding to FIG. 6, during the pivoting back of the actuation handle from the forwardmost position rearward in the direction of the zero position (approximately 10° forward in relation to the zero position)

As soon as the actuation force F ceases, that is to say as soon as the actuation handle 152 is released, a spring (not illustrated in the Figures) pivots back the actuation handle 152, as illustrated in FIGS. 9 to 11, until the latter has again reached the zero position (FIG. 12).

Figure 13:
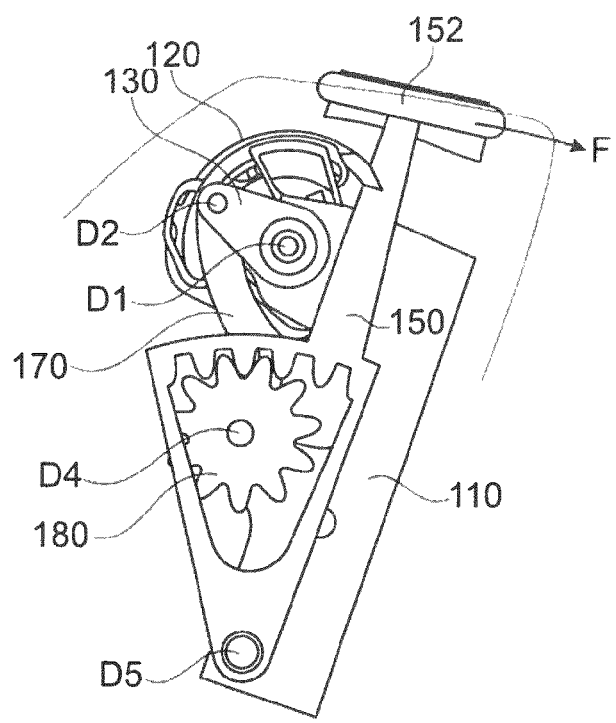
FIG. 13 is a side view, corresponding to FIG. 4, during the pivoting of the actuation handle rearward (by approximately 5° in relation to the zero position)
Figure 14:
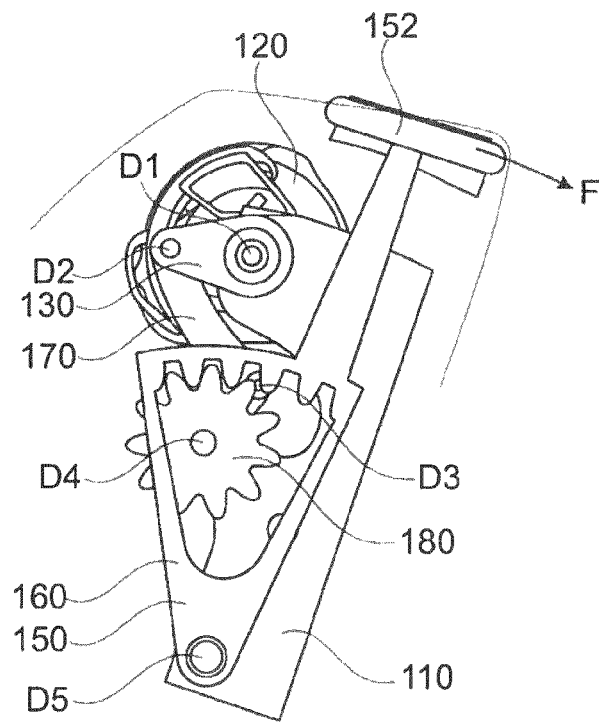
FIG. 14 is a side view, corresponding to FIG. 4, during the pivoting of the actuation handle rearward (by approximately 10° in relation to the zero position)
Figure 15:
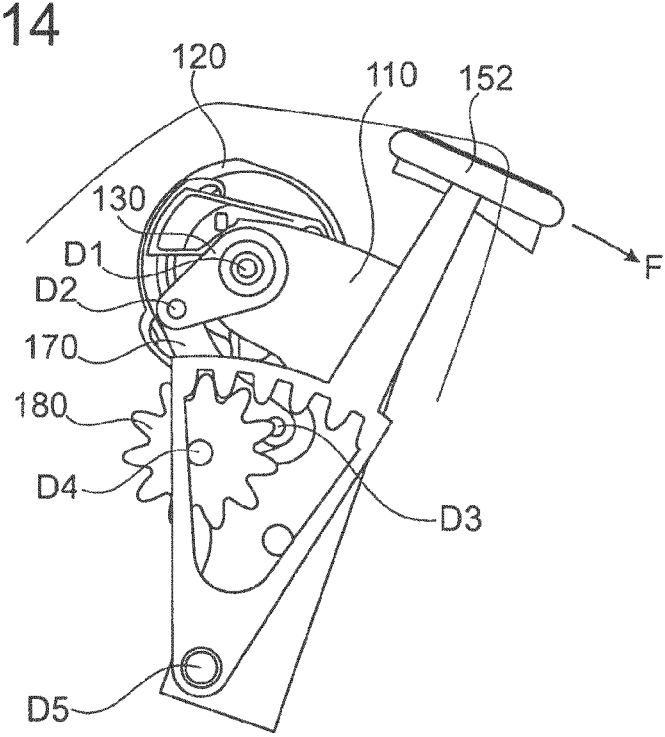
FIG. 15 is a view, corresponding to FIG. 4, with an actuation handle completely pivoted rearward (by approximately 17° in relation to the zero position).

In order to unlock the locks 23 and subsequently pivot back the vehicle seat 1 from the entry position into the use position, the actuation handle 152 is pulled with an actuation force F rearward, and therefore in the direction of movement of the vehicle seat 1, as illustrated in FIGS. 13 to 15.

In a departure from the movement sequence described, the actuation handle 152 can basically also be actuated in the other direction in each case. However, this is less expedient from an ergonomic aspect.

The actuation device 100 described serves here for actuating the locks 23. However, such an actuation device may in principle also be used for actuating all locking mechanisms which are known per se in vehicle seats, in particular also for actuating seat rails and backrest adjusters. The vehicle seats may have a very wide variety of movement kinematics.

The features disclosed in the above description, the claims and the drawings may be of importance both individually and in combination for implementing the invention in its various refinements. While specific embodiments of the invention have been shown and described in detail to illustrate the application of the principles of the invention, it will be understood that the invention may be embodied otherwise without departing from such principles.

The invention claimed is:

1. An actuation device for a vehicle having at least one locking mechanism, the actuation device comprising:
    a housing;
    an actuation handle, mounted on the housing, for unlocking the at least one locking mechanism; and
    a connecting device that couples the actuation device to the at least one locking mechanism, wherein the actuation handle is actuable in two different directions to each other in a range, and the at least one locking mechanism is unlockable both by actuation of the actuation handle in one of the two different directions and by actuation of the actuation handle in another of the two different directions;
    an intersecting point which is movable relative to the housing for fastening to the connecting device, the intersecting point being operatively connected to the actuation handle and when the actuation handle is actuated, a movement direction of the intersecting point relative to the housing is independent of the actuation handle being actuated in the two different directions;
    a gearing operatively connected to the intersecting point, wherein the actuation handle drives the gearing and, when the actuation handle is not actuated, individual gearing members of said gearing are located corresponding to a center position of the range.

2. The actuation device as claimed in claim 1, further comprising an elastic means wherein, in an unactuated state, the actuation handle is held in the center position by the elastic means, and, from said center position, the lever is selectively actuable in one of the two directions.

3. The actuation device as claimed in claim 2, wherein the elastic means is a spring.

4. The actuation device as claimed in claim 2, wherein the elastic means acts between the housing and the actuation handle.

5. The actuation device as claimed in claim 1, wherein the connecting device comprises a cable pull or a Bowden cable.

6. The actuation device as claimed in claim 1, wherein two gearing members of the gearing are in an extended position with respect to each other with the gearing located in the center position.

7. The actuation device as claimed in claim 6, wherein the gearing has a toothed segment connected to the actuation handle, an intermediate wheel meshing with the toothed segment, a rocker fastened to the intermediate wheel, a coupler connected to the rocker, and an eccentric connected to the coupler, and the intersecting point is coupled to the eccentric.

8. The actuation device as claimed in claim 7, wherein a component is mounted on the housing so as to be rotatable about a first axis of rotation and connects the intersecting point to the eccentric.

9. The actuation device as claimed in claim 8, wherein the eccentric is connected to the coupler so as to be rotatable about a second axis of rotation, the coupler is connected to the rocker so as to be rotatable about a third axis of rotation, the intermediate wheel and the rocker are mounted on the housing so as to be rotatable about a fourth axis of rotation, and the toothed segment and the actuation handle are mounted on the housing so as to be rotatable about a fifth axis of rotation.

10. The actuation device as claimed in claim 9, wherein, when the actuation handle is not actuated, the rocker and the coupler are in an extended position with respect to each other, and therefore the second axis of rotation, the third axis of rotation and the fourth axis of rotation are connectable to one another by a straight line.

11. The actuation device as claimed in claim 8, wherein the component which is mounted on the housing so as to be rotatable about the first axis of rotation is an indicator which, by means of its angular position about the first axis of rotation, indicates a locking state of the at least one locking mechanism.

12. A vehicle seat comprising at least one locking mechanism and an actuation device comprising:
   a housing;
   an actuation handle mounted on the housing for unlocking the at least one locking mechanism; and
   a connecting device that couples the actuation device to the at least one locking mechanism, wherein the actuation handle is actuable in two different directions to each other in a range, and the at least one locking mechanism is unlockable both by actuation of the actuation handle in one of the two different directions and by actuation of the actuation handle in another of the two different directions;
   an intersecting point which is movable relative to the housing for fastening to the connecting device, the intersecting point being operatively connected to the actuation handle and when the actuation handle is actuated, a movement direction of the intersecting point relative to the housing is independent of the actuation handle being actuated in the two different directions;
   a gearing operatively connected to the intersecting point, wherein the actuation handle drives the gearing and, when the actuation handle is not actuated, individual gearing members of said gearing are located corresponding to a center position of the range.

13. The vehicle seat as claimed in claim 12, wherein the vehicle seat is movable between at least one use position for conveying an individual and an entry position arranged further forward in relation to the use position when the at least one locking mechanism is in an unlocked state.

14. The vehicle seat as claimed in claim 12, wherein the actuation device is arranged in an upper region of a backrest of the vehicle seat.

15. An actuation device for a vehicle having a locking mechanism, the actuation device comprising:
   a housing;
   a connecting device connected to the locking mechanism;
   an actuation handle movably mounted on said housing in two different directions relative to said housing and within a range;
   an intersecting point movably mounted on said housing and fastened to said connecting device, said intersecting point and said connecting device being configured to unlock the locking mechanism by movement of said intersecting point in an unlocking direction relative to said housing;
   a connection arrangement connecting said intersecting point to said actuation handle, said connection arrangement transferring movement of said actuation handle in both of said two different directions into movement of said intersecting point in said unlocking direction;
   elastic means biasing said actuation handle in a central position in said range;
   said connection arrangement transferring movement of said actuation handle in both of said two different directions away from said central position, into movement of said intersecting point in said unlocking direction.

\* \* \* \* \*